United States Patent [19]

Uehara et al.

[11] Patent Number: 4,773,032
[45] Date of Patent: Sep. 20, 1988

[54] TERMINAL INPUT APPARATUS

[75] Inventors: Koich Uehara, Fuchu; Atsuhiro Inoue, Machida; Shinich Kanda, Tama, all of Japan

[73] Assignee: Fujitsu Limited, Kawasaki, Japan

[21] Appl. No.: 799,970

[22] Filed: Nov. 20, 1985

[30] Foreign Application Priority Data

Nov. 20, 1984 [JP] Japan .................. 59-243325
Nov. 20, 1984 [JP] Japan .............. 59-175106[U]

[51] Int. Cl.⁴ .................. G06F 3/00; H01R 9/00; H05K 7/00
[52] U.S. Cl. .................. 364/709.04; 364/900; 364/709.12; 439/135
[58] Field of Search .................. 364/707–710, 364/900 MS File; 439/289, 135, 137–138; 340/365 P; 361/380

[56] References Cited

U.S. PATENT DOCUMENTS

| | | | |
|---|---|---|---|
| 2,093,037 | 9/1937 | Douglas | 439/289 X |
| 2,986,612 | 5/1961 | Healy | 439/135 X |
| 3,533,046 | 10/1970 | Banning | 439/289 |
| 3,766,327 | 10/1973 | Johnson et al. | |
| 4,115,870 | 9/1978 | Lowell | 364/709 |
| 4,119,813 | 10/1978 | Sato | 439/137 X |
| 4,151,596 | 4/1979 | Howells | 364/709 |
| 4,493,517 | 1/1985 | Hillary | 439/137 |
| 4,654,818 | 3/1987 | Wetterau, Jr. | 364/709 |

FOREIGN PATENT DOCUMENTS

| | | |
|---|---|---|
| 0045189 | 2/1982 | European Pat. Off. |
| 0082774 | 6/1983 | European Pat. Off. |
| 1553913 | 1/1969 | France |
| 56-111937 | 9/1981 | Japan |
| 449831 | 7/1936 | United Kingdom |
| 2087655 | 5/1982 | United Kingdom |
| 2106728 | 4/1983 | United Kingdom |

*Primary Examiner*—Gary V. Harkcom
*Assistant Examiner*—Long Thanh Nguyen
*Attorney, Agent, or Firm*—Staas & Halsey

[57] ABSTRACT

A terminal input apparatus includes a portable input device having a data input key and a main device provided with a holder for holding the portable input device therein. The holder has a main device side connector which is to be connected to a connector arranged in the lower portion of the portable input device. The holder is arranged so that the holder can be moved relative to the main device between a storing position (at which the stored portable input device is parallel to the main device) and an extraction position (at which the portable input device insertion opening of the holder is projected toward the operation face of the main device, and the portable input device is inclined relative to the main device).

14 Claims, 17 Drawing Sheets

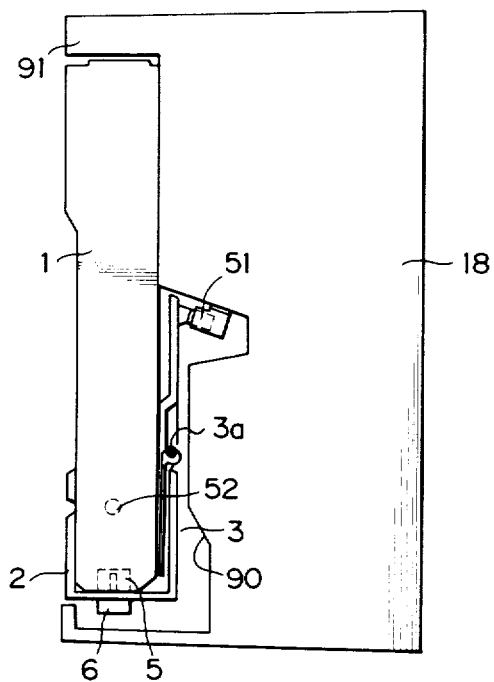
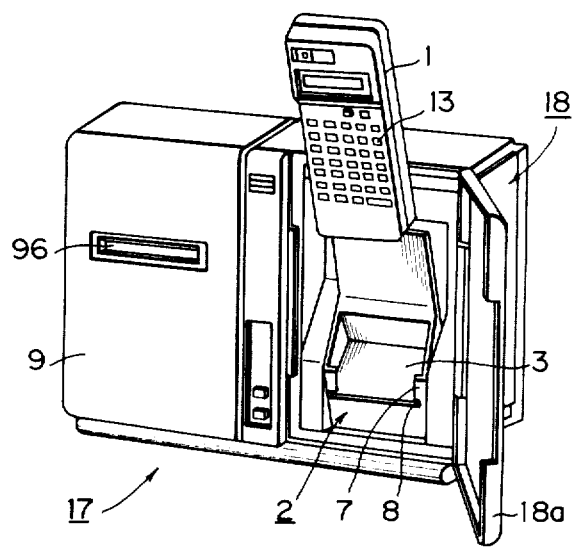

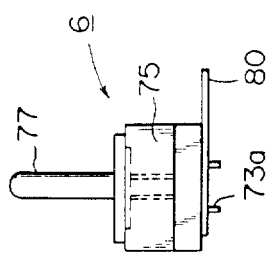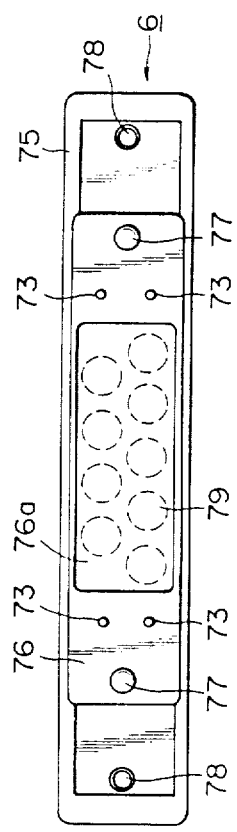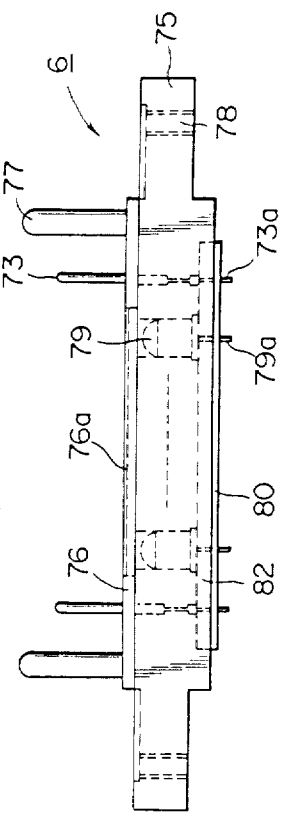

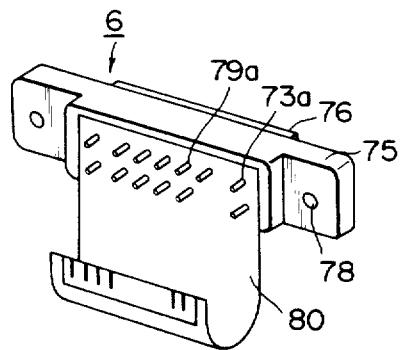
Fig.19
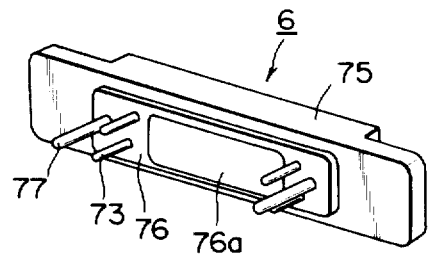
Fig.20
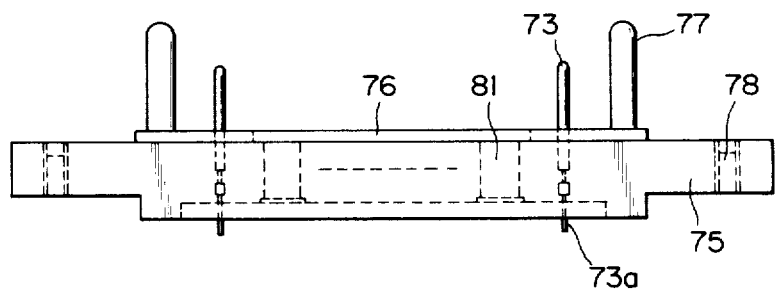
Fig.21
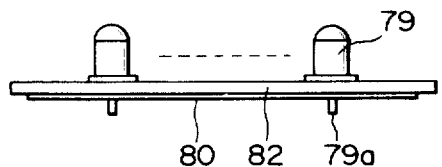

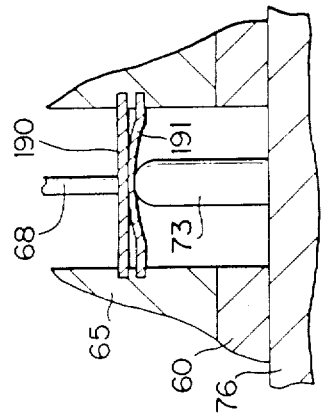
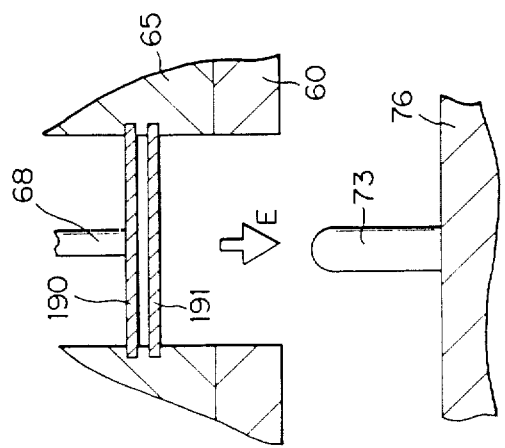
Fig. 23(a)
Fig. 23(b)

TERMINAL INPUT APPARATUS

BACKGROUND OF THE INVENTION

1. Field of the Invention

The present invention relates to a terminal input apparatus having a terminal data processing circuit connected to a central processing unit. More particularly, the present invention relates to a terminal input apparatus comprising a portable input device having an input key and a main device having a holder for the portable input device. Furthermore, the present invention relates to a connector suitable for use in this terminal input apparatus, and particularly, the present invention relates to a water-proof and dust-proof structure for a contact insertion hole in a connector utilizing mechanical connection between two contacts.

2. Description of the Related Art

As a means for precisely and promptly performing the management of sales of goods and the maintenance of stock, a vehicle-mounted terminal apparatus has been developed comprising a data processing device mounted on a goods-transporting truck for a sales network. Data, such as the kinds and quantities of goods are input according to customers requirements, and this data is processed by aggregation and editing. This terminal input apparatus has a portable input device having an input key and a connector in the lower portion and a main device having a holder for containing the portable input device, which is arranged on the front face of a casing. A data processing circuit is arranged in the main device having a holder for containing the portable input device, which is arranged on the front face of a casing. A data processing circuit is arranged in the main device and the holder has an insertion opening for the portable input device in the upper portion; and in the lower portion, has a main device side connector to be connected to a connector arranged in the lower portion of the portable input device.

Where this terminal input apparatus is mounted in a driver's cab of a goods-transporting truck, for reasons of space, the apparatus is attached to the side wall above the window on the driver's side. In this case, since the height of the ceiling of the driver's cab is limited, the space above the terminal input apparatus is very narrow and the operation of inserting the portable input device in the holder or extracting it therefrom is very difficult.

A connector for electrically connecting the portable input device to the main device should be disposed in the data processing apparatus comprising the portable input device and the main device provided with a data processing circuit, and a weak current (such as a signal current for transmitting data) and a large current (such as a power source current for driving electronic parts) transmitted through this connector. In this case, when the connection is for a weak current. Instead, a non-contact type light connection connector may be used to avoid abrasion and degradation of the contacts due to insertion and extraction of the connector. On the other hand, a light connection connector cannot be used for a large current such as a driving power current, and a mechanical contact type connection connector utilizing mechanical connection between contacts is used for such a large current. The conventional mechanical contact type connection connector has a structure in which a first connector (plug) is coupled to a second connector (jack), and a first contact (male contact) projected from the first connector is mechanically placed in contact with a second contact (female contact) arranged in the interior of an insertion hole of the second connector to electrically connect the first and second contacts.

If the conventional mechanical contact type connection connector is applied to the above-mentioned data processing apparatus, while the portable input device is being used when separated from the main device, the contact insertion hole of the connector is always open and, therefore, dust and water intrude into the connector through this insertion hole to cause problems such as contact failure.

SUMMARY OF THE INVENTION

It is a primary object of the present invention to provide a terminal input apparatus in which the operations of storing and extracting a portable input device can be performed very easily.

Another object of the present invention is to provide a dust-proof and water-proof connector especially suitable for the above terminal input apparatus.

In order to attain the above objects, according to the present invention, a holder of a main device is arranged so that the holder can be moved between a storing position, at which a stored portable input device becomes parallel to the main device, and an extraction position at which a portable input device insertion opening of the holder is projected toward the operation face of the main device, and the stored portable input device is inclined relative to the main device.

When the portable input device is inserted into the holder of the main device or extracted therefrom, the holder is rotated with the lower portion thereof as the center of rotation, the portable input device insertion opening is projected toward the front of the main device, and the holder is inclined relative to the casing of the main device. After the portable input device has been stored, the holder is again rotated with the lower portion thereof as the center of rotation until the holder becomes parallel to the casing of the main device, and the portable input device is returned to the straight and vertical (not inclined) posture.

In order to solve the above-mentioned problem of the conventional technique, according to the present invention, in a connector structure where a first connector is coupled with a second connector to form a mechanical contact between a first contact projected from the first connector and a second connector formed in the interior of an insertion hole of the second connector and thus bring about an electrical contact between the first and second contacts, two closing members capable of elastically touching and separating from each other are arranged in parallel to each other above the second contact in the insertion hole of the second connector, so that the closing members are in contact with each other on the axis of the insertion hole, and when the first contact is inserted in the insertion hole, the two closing members are pushed outward.

More specifically, two closing members, for example, two cylindrical members, are brought into line contact with each other in parallel to each other by means of a spring, and both the cylindrical members are arranged in parallel to each other so that the above contact line is in agreement with the axis of the insertion hole. The insertion hole is normally closed by the two cylindrical members. When the contact of the first connector is inserted into the insertion hole, the two cylindrical members are pushed outward to be separated from each other, and the contact of the first connector is brought into contact with the contact of the second connector in the insertion hole.

BRIEF DESCRIPTION OF THE DRAWINGS

FIGS. 1 and 2 are side views illustrating the inclined state and storing state of the holder of the terminal input apparatus of the present invention;

FIGS. 3 and 4 are perspective views showing the terminal input apparatus in the states shown in FIGS. 1 and 2;

FIGS. 18(a)–18(c) are diagrams illustrating the structure of the connector on the side of the holder according to the present invention;

FIGS. 19 and 20 are perspective views of the connector of FIGS. 18(a)–18(c) seen from different angles;

FIG. 21 is an exploded view of the connector shown in FIG. 18;

FIGS. 23(a) and 23(b) are diagrams illustrating the function of the connector shown in FIG. 22;

DESCRIPTION OF THE PREFERRED EMBODIMENTS

Figure 1:
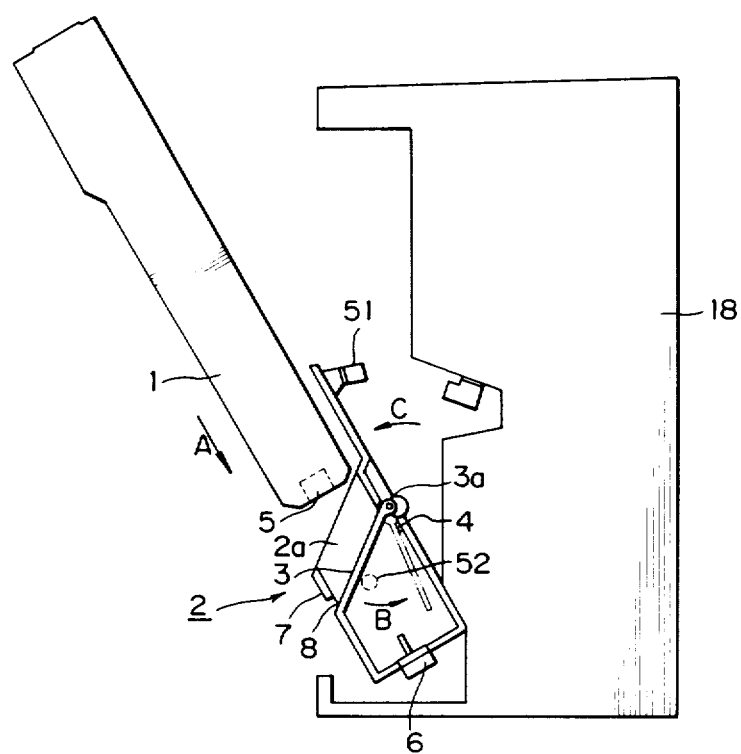
Figure 4:
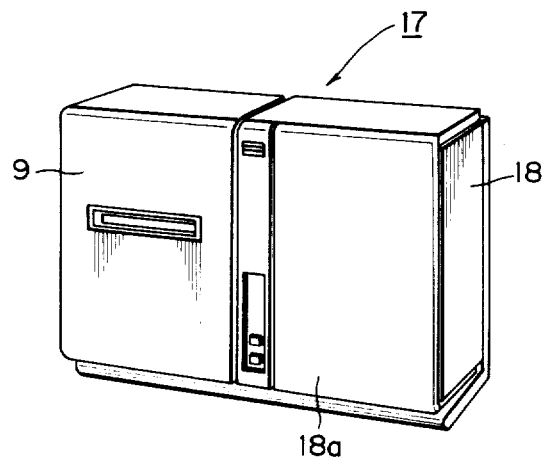
Figure 5:
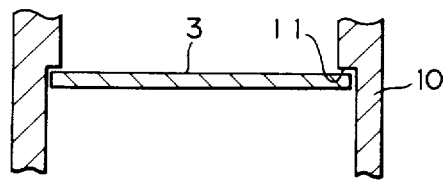
FIG. 5 is a sectional view of a lid of the holder of the present invention.

FIGS. 1 and 2 are side views showing different states of the terminal input apparatus according to the present invention, and FIGS. 3 and 4 are perspective views of these different states. A portable input device (hand held terminal; hereinafter referred to as "HHT") 1 having an input key 13 (FIG. 3) on the front face and a connector 5 in the lower portion is stored in a holder 2 on the front face of a main device 18. A connector 6 to be connected with the connector 5 of the HHT 1 is arranged on the lower face of the holder 2. The main device 18 has a data processing circuit (described hereinafter) built therein. The processing result is printed out on paper by a printer unit 9 (FIG. 3) and the paper is output from an outlet 96. A terminal unit 17 (FIG. 3) is constructed by the main device 18 having the HHT 1 held therein. A hinge type door 18a is arranged on the front face of the main device. The holder 2 is attached to the main device 18 in such a manner that the holder 2 can be rotated on an axis 52 thereof as the center of rotation, thereby allowing the holder 2 to be rotated and moved between the storing position (FIGS. 2 and 4) at which the stored HHT 1 is parallel to the main device 18 and the extraction position (FIGS. 1 and 3) at which an insertion opening 2a for the HHT 1 in the upper portion of the holder 2 is projected toward the front face (operation face) of the main device 18 and the holder 2 is inclined relative to the main device 18. At the storing position, the HHT 1 is in the straight and vertical posture and the top end thereof is located below a guard projection 91 (FIG. 2) at the top end of the front face of the main device 18. A roller (not shown) formed of an appropriate elastic material may be mounted on the projection 91 so that, when the HHT 1 is stored, the top end of the HHT 1 is pressed by the roller to prevent the HHT 1 from vibrating and to hold the HHT 1 firmly in the holder 2. In the storing position, the holder 2 is secured and held by an appropriate lock means 51 (FIG. 2) (For example, a mechanical means for locking a member by thrusting that member against an elastic force of another member, or a magnetic means using a magnet). The rotation of the holder 2 around the axis 52 is regulated by impingement of the holder 2 against a stopper face 90 (FIG. 2) of the main device 18. A lid 3 (FIG. 2), which is normally closed by a spring 4 and is pushed downward and opened by insertion of the HHT 1, is attached to the insertion opening 2a formed in the upper portion of the holder 2 in such a manner that the lid 3 rotates around an axis 3a thereof. The lid 3 is inclined downward toward the outside in the closed state. Guides 7 for insertion of the HHT 1 are arranged in the upper portion of the lid 3 on both the sides of the upper portion of the front face of the holder 2. A clearance 8 (FIG. 1) is formed below the guides 7 to allow dust on the top face of the lid 3 to fall therethrough. To extract the HHT 1 in the stored state shown in FIG. 2, the HHT 1 is pulled forward out and against the force of the lock means 51 and the holder 2 is rotated around the axis 52 as indicated by the arrow C (FIG. 1). The HHT 1 is then drawn out obliquely upward to the inclined extraction position as shown in FIG. 1. After use, the HHT 1 is inserted in the inclined holder 2 as indicated by the arrow A, whereby the lid 3 is pushed and rotated as indicated by arrow B, the HHT 1 is stored in the holder 2, and the connectors 5 and 6 are connected to each other. The holder 2 is then rotated around the axis 52 in a direction opposite to the direction indicated by arrow C and is returned to the storing position shown in FIG. 2. As mentioned above, since the holder 2 is constructed in such a manner that it can be tilted relative to the main device 18, the operations of extracting and storing the HHT 1 can be performed very smoothly. In the storing position, the holder 2 is locked by the lock means 51 and the HHT 1 is located below the projection 91 of the main device 18. Accordingly, the HHT 1 cannot fall out of the main device 18 and the connectors will not be disconnected by vibration while the apparatus is mounted on a truck. Furthermore, since the openable lid 3 which is normally closed is arranged on the opening 2a for insertion of the HHT 1 in the holder 2, even if the HHT 1 is extracted, dust or the like is not allowed to intrude into the holder 2. Moreover, since the lid 3 is inclined, dust does not adhere to the top face of the lid, and therefore, the intrusion of dust accumulated on the top face of the lid into the interior by insertion of the HHT 1 does not occur. Accordingly, when connectors of an electronic circuit actuated by a weak current, especially light connectors, are arranged in the holder, the effect of improving the reliability of the connection by this dust-proof effect is very high. As shown in FIG. 5, steps 11 are formed on both the side walls 10 of the holder 2 so that the thickness is increased at parts located above the lid 3, and when the lid 3 is closed, the lid 3 is caused to impinge against the steps 11, whereby the side edges of the top face of the lid 3 are covered and the intrusion of dust can be completely prevented.

Figure 6:
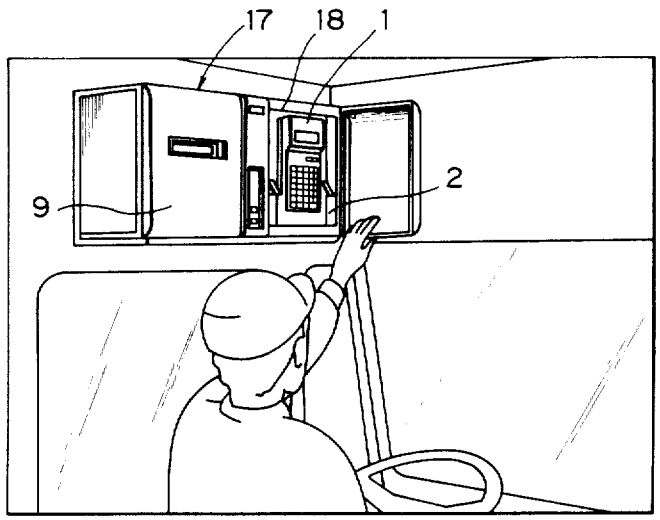
FIGS. 6, 7 and 8 are perspective views showing respective usage states of the terminal input apparatus of the present invention.
Figure 7:
Figure 8:

Usages of the terminal input apparatus of the present invention are shown in FIGS. 6 through 11, in which FIG. 6 illustrates the apparatus mounted above a side window of a driver's cab of a goods-transporting truck; FIG. 7 illustrates an operator in the act of confirming the kinds and quantities of goods at a customer's office, for example, a supermarket, and inputting this data into the HHT 1; and FIG. 8 illustrates the HHT 1 attached to a communications interface unit (CIU) 15 connected to a host computer (central processing unit) at an operator's office, and the operator in the act of inputting aggregation data and the like to the host computer.

Figure 10:
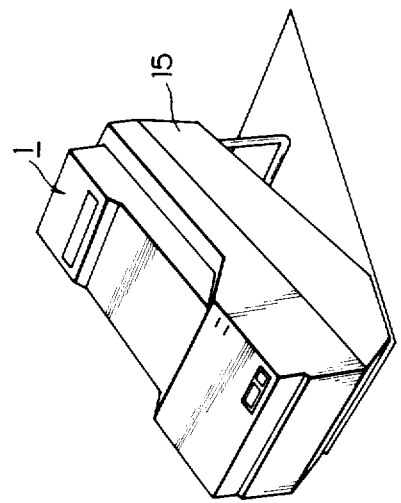
FIG. 10 is a perspective view of a communications interface unit (CIU) according to the present invention.
Figure 9:
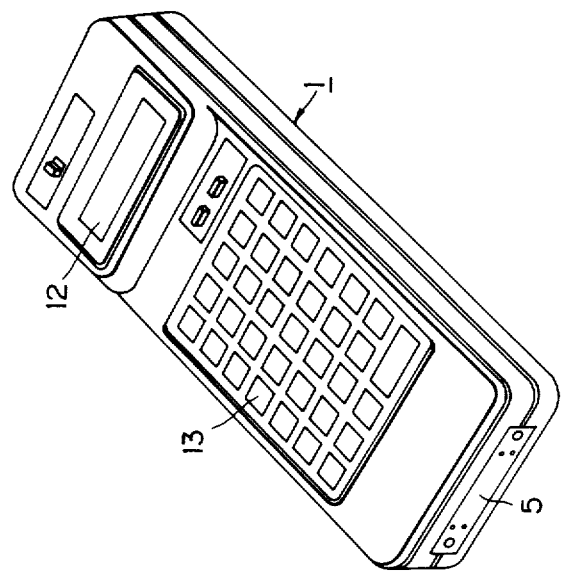
FIG. 9 is a perspective view of a hand held device (HHT) according to the present invention.
Figure 11:
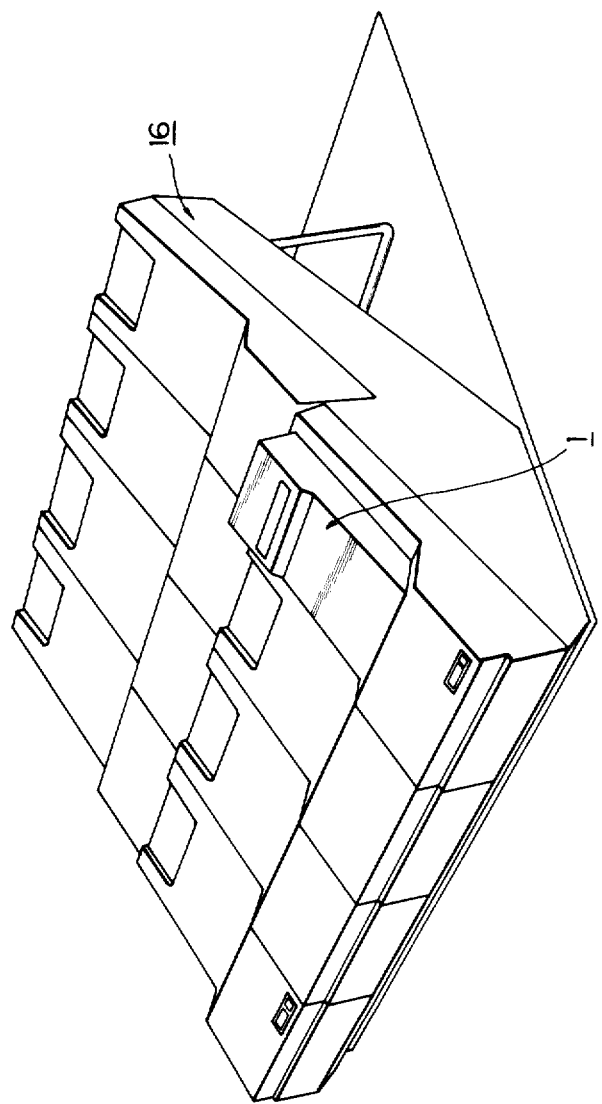
FIG. 11 is a perspective view of a multi-CIU (MCIU) according to the present invention.

FIG. 9 is a perspective view of the HHT 1. Input keys 13 and a liquid crystal display panel 12 are arranged on the surface of the HHT 1, and the connector 5 is arranged in the lower portion thereof. FIG. 10 is a perspective view showing the HHT 1 attached to the CIU 15. FIG. 11 is a perspective view showing a multi-CIU (MCIU) 16 in which a plurality of CIU's are connected to enable the use of a plurality of HHT's.

Figure 12A:
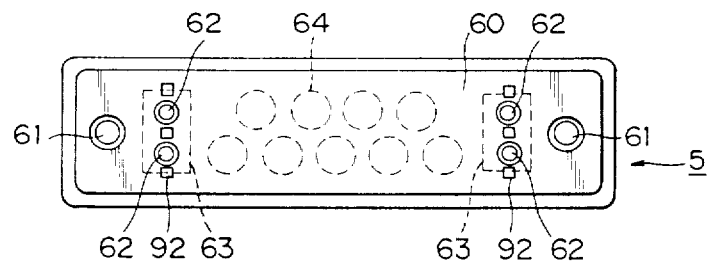
FIGS. 12(a)–12(c) are diagrams illustrating the structure of the connector on the HHT side according to the present invention.
Figure 12B:
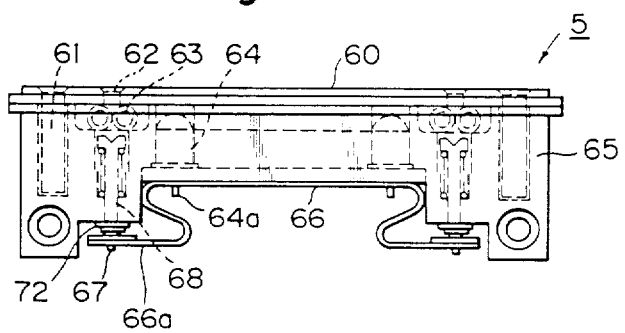
Figure 12C:
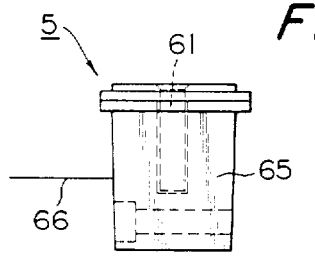
Figure 13:
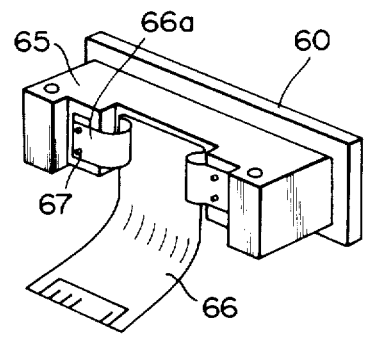
FIGS. 13 and 14 are perspective views of the connector of FIGS. 12(a)–12(c) seen from different angles.
Figure 14:
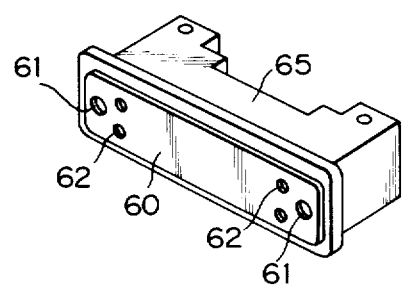
Figure 15:
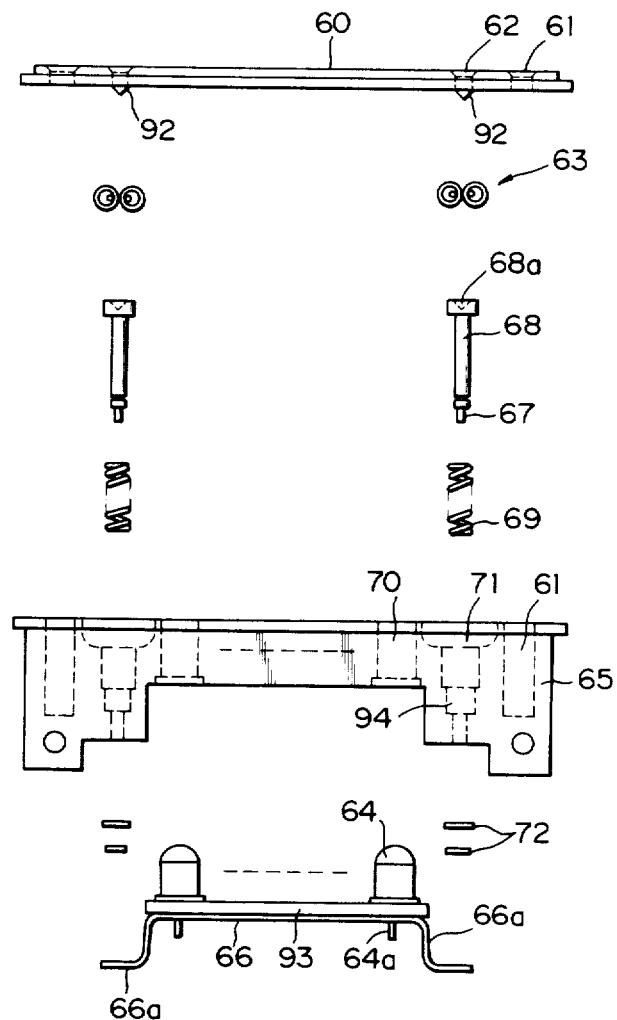
FIG. 15 is an exploded view of the connector shown in FIGS. 12(a)–12(c)

The connector of the HHT 1 is illustrated in detail in FIGS. 12 through 15, in which FIG. 12 (a) is a top view; FIG. 12 (b) is front view; FIG. 12 (c) is a side view; FIG. 13 is a perspective view seen from the back; FIG. 14 is a perspective view seen from the upper face; and FIG. 15 is an exploded view. The top face of a body 65 of the connector 5 is covered with a transparent plate 60 (for example, an acrylic plate). Guide holes 61 are formed on both end portions of the connector 5 to receive guide studs (described hereinafter) of the corresponding connector. A plurality of LED's 64 are arranged in the middle portion of the connector 5. Each LED 64 is paired with a phototransistor (described hereinafter) of the corresponding connector to construct a light-connection connector. Holes 62 for receiving connection pins (described hereinafter) of the corresponding connector are formed on both the outer sides of the group of LED's 64. Hole closing means 63 (described hereinafter) for attaining the desired dust-proofing and water-proofing effects are arranged below the holes 62. Connection lead terminals 68 are provided corresponding to the respective holes 62. LED-receiving holes 70 (FIG. 15), recesses 71 for arrangement of the hole-closing means 63, and holes 94 for insertion of the lead terminals 68 are formed in the body 65. A conical recess 68a is formed on the top end of the lead terminal 68 to increase the area for contact with the corresponding connection pin. The LED's 64 are mounted on a supporting plate 93 and terminals 64a thereof are connected to a flexible printed circuit board 66. The lead terminals 68 are inserted in the holes 94 through springs 69. The lower end 67 of each lead terminal 68 is connected to a flexible printed circuit board 66a contiguous integrally to both the sides of the top end portion of the flexible printed circuit board 66.

Figure 16:
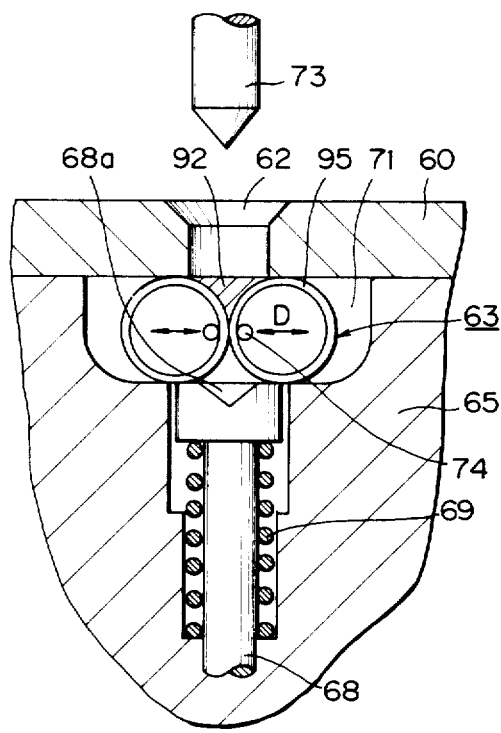
FIG. 16 is a detailed view showing a part of the connector of FIGS. 12(a)–12(c)
Figure 17:
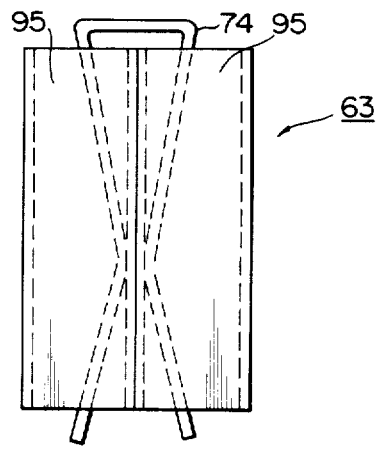
FIG. 17 is a diagram illustrating the structure of the means for closing the insertion opening of the connector of FIGS. 12(a)–12(c)

The hole-closing means 63 is illustrated in detail in FIGS. 16 and 17. Two cylindrical collars 95 are arranged in a recess 71 of the body 65 below the hole 62 for receiving a connection pin 73 of the corresponding connector. The cylindrical collars 95 are brought into contact with each other by a spring 74 so that the axes of the collars 95 are parallel to each other. Sealing members 92 (see FIG. 12 (a)) having a substantially triangular section (FIG. 16.), each having a shape agreeing with the other configuration of the cylindrical collar 95, are arranged between two adjacent holes 62 and on both the sides thereof below the transparent plate 60. The clearance along the contact portion between the cylindrical collars 95 (which clearance is formed when the holes 62 are opened), is filled by the sealing members to prevent the intrusion of dust and water through this clearance. The cylindrical collars 95 are capable of elastically touching and separating from each other, as indicated by an arrow D, in the recess 71. When the connection pin 73 is inserted through the hole 62, the cylindrical collars 95 are pushed outward to be separated from each other against the spring 74, and the conical top end of the connection pin 73 is received in the conical recess 68a in the upper portion of the lead terminal 68 to electrically connect the pin 73 to the lead terminal 68. If the length of the connection pin 73 and the length of the lead terminal 68 are arranged so that at the time of this electrical connection, the lead terminal 68 is pressed down against the spring 69 by the pressing force of the pin 73, reliable connection can be attained. Since the flexible printed circuit board 66a connected to the end portion of the lead terminal 68 has an excessive length, the movement of the lead terminal 68 in the vertical direction is not hindered.

The connector 6 on the side of the main device 18, which is arranged in the lower portion of the holder 2, is illustrated in detail in FIGS. 18 through 21, in which FIG. 18 (a) is a top view; FIG. 18 (b) is a front view; FIG. 18 (c) is a side view; FIG. 19 is a perspective view seen from the back; FIG. 20 is a perspective view seen from the top face; and FIG. 21 is an exploded view. The top face of a body 75 constituting the connector 6 is covered with an insulating plate 76 having a transparent part 76a in the central portion. Phototransistors 79 confronting LED's 64 of the HHT 1 are arranged below the transparent part 76a. Each phototransistor 79 is mounted on a supporting plate 82 and a terminal 79a thereof is bonded to a flexible printed circuit board 80 arranged below the supporting plate 82. Phototransistor-inserting holes 81 and connector-attaching holes 78 are formed in the body 75. Reference numeral 73 represents a connection pin to be connected to the lead terminal of the above-mentioned HHT connector 5, and a lower terminal 73a of the pin 73 is bonded to the flexible printed circuit board 80. Reference numeral 77 represents a registering guide stud corresponding to the guide hole 61 of the above-mentioned HHT connector 5.

When the HHT 1 is stored in the holder 2, the guide stud 77 of the holder connector 6 is inserted in the guide hole 61 of the HHT connector 5, and the connectors 5 and 6 are connected to each other. Four connection pins 73 and lead terminals 68 are used as a mechanical coupling connector for connection of a large current (for example, for supply of a power source current for charging a battery built in the HHT 1, for supply of a power for driving the HHT circuit during charging; for grounding or for transmission of a signal for detection of the setting of the HHT 1, and LED's 64 and phototransistors 79 are used as a light connection connector. In the mechanical coupling connector, electric conduction is obtained by the mechanical contact between the lead terminal 68 and the connection pin 73. In the light connection connector, when light is emitted from one connector LED 64 on receipt of a signal current of the element, the confronting phototransistor 79 as the corresponding connector is actuated to transmit the signal current therethrough. One light connection connector set is constructed by one LED 64 and one phototransistor 79, and the connector structure comprises a plurality of sets of light connection connectors as a whole (9 sets in the embodiment illustrated in the drawings). In the illustrated embodiment, the LED 64 of each set is mounted on the HHT connector 5. In each set, however, the LED 64 may be optionally arranged on the HHT connector 5 or the holder connector 6.

In the above-mentioned connector structure, one connector is constructed by integrally combining the mechanical coupling connector with the light connection connector. Accordingly, a weak current and a large current can be independently transmitted without increasing the size of the entire structure. In particular, by using the light connection connector for the connection of a weak current, which is readily influenced by abrasion and degradation of the pins, the problem of abrasion and degradation of connecting pins by the mechanical connection can be overcome, and the mechanical connection can be applied to a large current to which the light connection is not applicable. Therefore, the size of the connector structure of the apparatus can be diminished and the durability of the apparatus can be increased. In the mechanical coupling means, the lead terminal 68 is not frictionally engaged with the connection pin 73 at the time of insertion or extraction, and both are pressed and connected to each other by pressing the top end portions of both the members in the insertion or extraction direction. Accordingly, the problem of abrasion and degradation by frictional contact between the lead terminal 68 and the connection pin 73 does not arise.

In the mechanical coupling connector structure in which the connection pin projected from one connector is inserted in the corresponding hole of the other connector to effect the connection, since the closing means which is normally closed by the spring and is pushed out and opened by the insertion of the connection pin is arranged in the insertion hole, the intrusion of dust or water through the insertion hole is prevented and problems such as insulation degradation or short circuit between the terminals do not occur.

If the cylindrical collar 95 constituting the closing means is formed of an elastic material such as a rubbery or plastic material and the two cylindrical collars are connected together at an end thereof so that they are brought into contact in parallel to each other, as shown in FIG. 17, the spring 74 may be omitted. There may be used instead two closing members having a shape other than cylindrical. It is sufficient if the contacting portions of the two members are inclined so that they are capable of elastically touching and separating from each other and thus the two members are pushed out by insertion of the connection pin.

Figure 22:
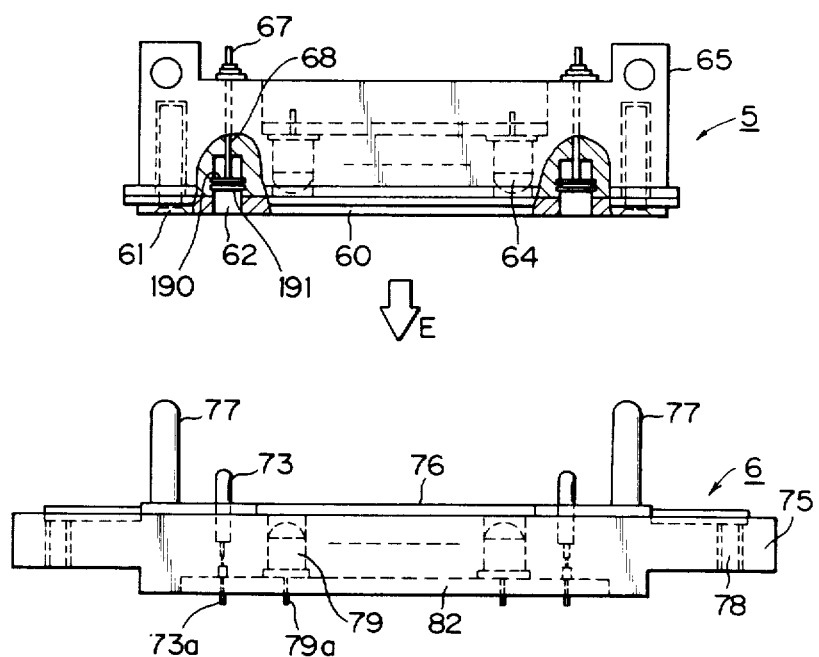
FIG. 22 is a diagram illustrating the structure of another example of the connector used for the terminal input apparatus according to the present invention.

FIG. 22 illustrates another example of the means for closing the pin insertion hole in the mechanical coupling connector in the connector structure according to the present invention. This example is different from the above-mentioned example only in that the mechanism for connection to the pin 73 is arranged in the pin insertion hole 62 of the HHT connector 5. Accordingly, an explanation of other portions is omitted. Two metal thin sheets 190 and 191 formed of stainless steel are arranged in the hole 62 in close proximity to each other. The lead terminal 68 is connected to the inner metal thin sheet 190. When the HHT connector 5 is connected to the holder connector 6 as indicated by the arrow E, the disconnected state shown in FIG. 23 (a) is changed to the connected state shown in FIG. 23 (b). The connection pin 73 impinges against the outer metal thin plate 191 to distort the sheet 191 inward and bring it into contact with the inner metal thin sheet 190, whereby the pin 73 is electrically connected to the lead terminal 68 through the two metal thin sheets 190 and 191.

In the mechanical coupling connector of the above-mentioned connector structure, where the pin of one connector is inserted into the hole of the other connector to connect the conntectors to each other, since the hole is covered with the metal thin sheet, the intrusion of dust or water into the connector through this hole is completely prevented. Accordingly, degradation of the connector terminal or internal circuit or a short circuit is prevented and the reliability of the connection is enhanced.

Figure 24:
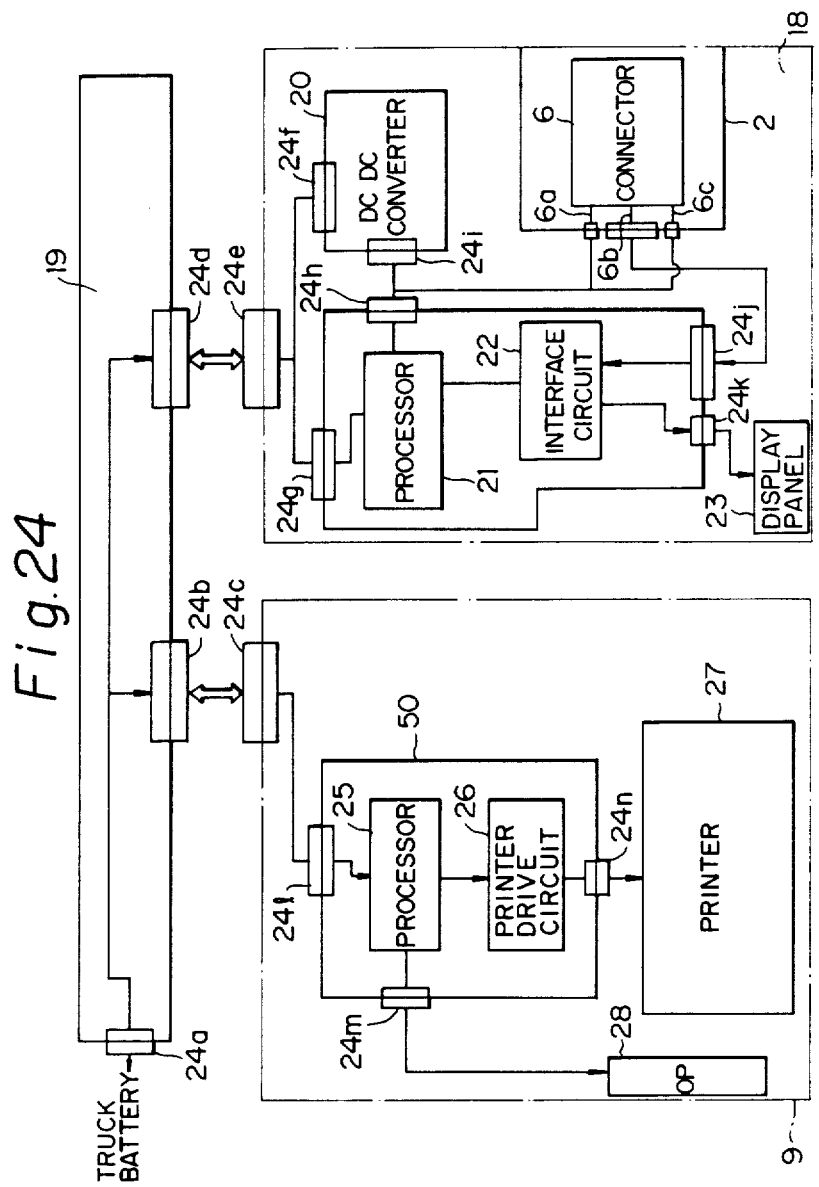
FIG. 24 is a block diagram of the terminal unit according to the present invention.

FIG. 24 is a block diagram of the internal structure of the truck-mounted terminal unit provided with the HHT holder 2 according to the present invention. The main device 18 provided with the holder 2 is connected to a wiring fitting 19, attached to a truck, through connectors 24d and 24e. A printer unit 9 is further connected to this wiring fitting 19 through connectors 24b and 24c. The wiring fitting 19 is connected to a car (or truck) battery (not shown) through a connector 24a. The HHT-connecting connector 6 of the holder 2 is connected to an interface circuit 22 through a connector 24j by a signal line 6b (connected to the light connection connector) and also through this interface circuit 22 to a processor 21. This processor 21 aggregates and edits data sent from the HHT and produces predetermined data (for example, dates, goods codes, and quantities of goods). The output data is fed as printing data to the printer unit 9 through the wiring fitting 19. A DC-DC converter (transformer) 20 converts the voltage (ordinarily 34 V) of the truck battery to +5 V, ±12 V, or ±26 V. The output of the converter 20 is supplied to respective circuits of the main device 18 and also to respective circuits in the printer unit 9 through the wiring fitting 19. When the HHT 1 is held in the holder 2, the output of the converter 20 is used as the power source for driving the HHT 1 and the power source for charging the battery in the HHT 1 through power source lines 6a and 6c of the connector 6. A display panel 23 is provided with an LED lamp and indicates the operation state of the apparatus, such as a power-on state, power-off state, or on-line state.

The printer unit 9 comprises a printer interface 50 including a processor 25 and a printer driving circuit 26, a printer 27, and an operator panel 28. The processor 25 feeds a driving signal to the printer driving circuit 26 according to the printing data fed from the processor 21 of the main device 18, to actuate the printer 27 and effect printing of the data. The operator panel 28 displays an error such as paper breakage or printer malfunction, and the operation state of the printer unit. Each of reference numerals 24a through 24h represents a connector.

Figure 25:
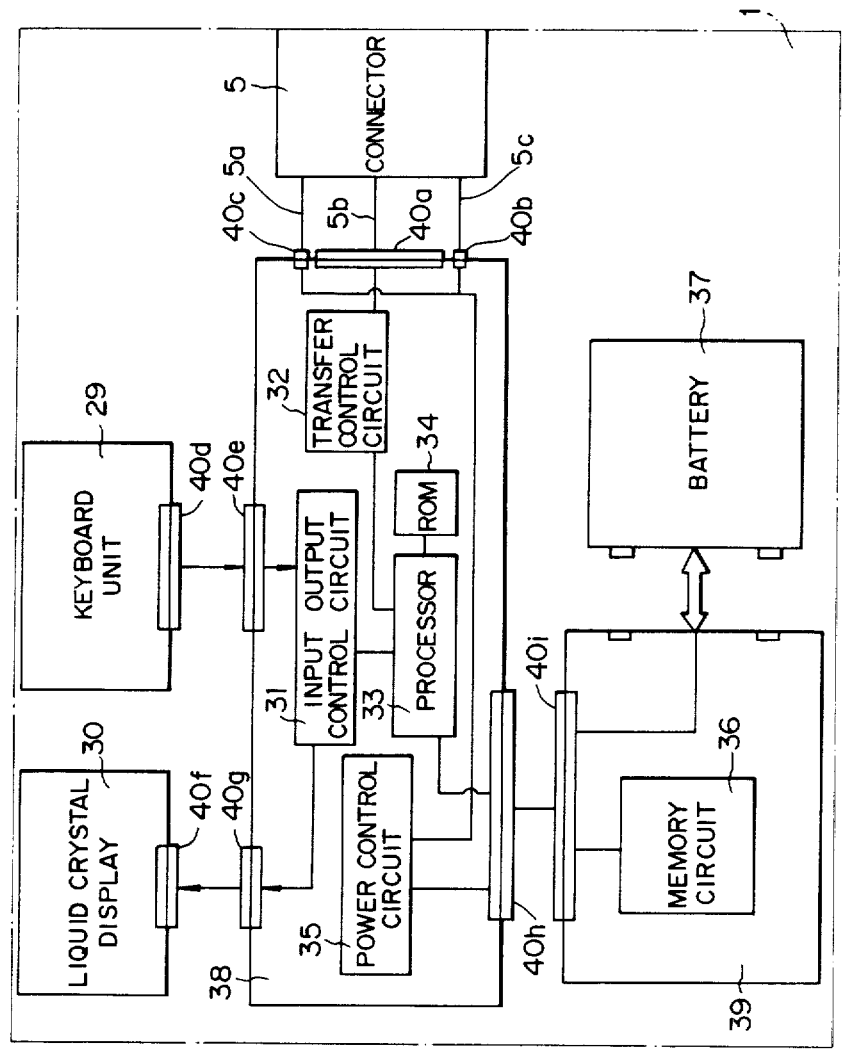
FIG. 25 is a block diagram of the HHT according to the present invention.

FIG. 25 is a block diagram of the internal structure of the HHT 1. A signal line 5b (connected to a signal line 6b of the connector 6) of the connector 5 is connected to a transfer control circuit 32 on a first printed circuit board 38. The transfer control circuit 32 sets the speed of transfer of data between the main device and the HHT 1 and other factors. An input output control circuit 31, a processor 33, a ROM 34, and a power control circuit 35 are arranged on the first printed circuit board 38. Power lines 5a and 5c (connected to power lines 6a and 6c of the connector 6) of the connector 5 are connected to the power control circuit 35. The power control circuit 35 selects the power source voltage of a battery 37 (Ni-Cd battery) built in the HHT1 or the power source voltage fed through the connector 5 from the main device 18. When the HHT 1 is held in the main device 18, the power source voltage supplied from the main device 18 is used, and when the HHT 1 is used in the state separated from the main device 18, the power source voltage of the battery 37 is used, whereby the respective circuits are driven. When the HHT 1 is held in the main device, the battery 37 is charged with the power source voltage from the main device 18 through the power control circuit 35. Data from the keyboard unit 29 is transferred to the processor 33 through the input output control circuit 31 and aggregation and editing of the data are performed by the processor 33 according to the control program of the ROM 34. The edited data is fed to a memory circuit 36 of a second printed circuit board 39 and stored therein. When the HHT 1 is held in the main device 18, the data stored in the memory circuit 36 is read out by the processor of the main device 18 and edited as printing data to be used for printing. The data input from the keyboard unit 29 is shown by a liquid crystal display 30 through the input/output control circuit 31.

Figure 26:
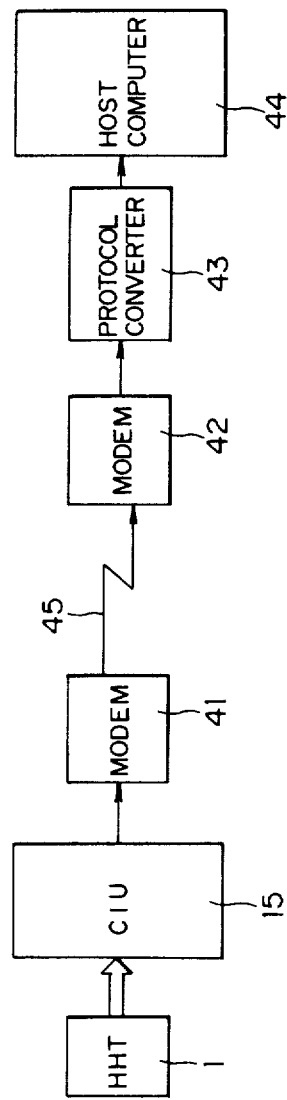
FIG. 26 is a diagram illustrating the circuit connection between a block central processing unit (host computer) and the CIU provided with the HHT of the present invention.

When the HHT 1 is removed from the truck-mounted terminal unit and is attached to a CIU 15 in an office, as shown in FIG. 26, data is transferred, via a modem 41, to a modem 42 on the side of the host computer 44, and is input to the host computer 44 through a protocol converter 43. A line 45 connecting the modems 41 and 42 to each other may be a directly-connected exclusive line, or may be a public line.

As is apparent from the foregoing description, according to the present invention, since the holder for the portable input device is arranged so that it can be moved between the storing position (at which the holder is parallel to the main device) and the extraction position (at which the holder is inclined), the operations of extracting and storing the portable input device can be performed smoothly. When the holder is locked by the lock means at the storing position and is located below the guard projection of the body of the device, the portable input device is firmly held in the holder and cannot be dislodged by vibration in the truck-mounted state, and the connection by the connectors cannot be loosened.

According to the present invention, in the mechanically coupling connector structure in which the first contact (connection pin 73) projected from the first connector (connector 6 on the side of the holder) is inserted into the insertion hole 62 of the second connector (connector 5 on the HHT side) to bring about mechanical contact between the first contact and the second contact (lead terminal 68), the closing means 63 which is normally closed and is pushed out and opened by the insertion of the connection pin, is provided. Therefore, insulation degradation and short-circuiting between the terminals by the intrusion of dust or water in the connector through the insertion hole can be prevented.

What is claimed is:
1. A terminal input apparatus comprising:
   a portable input device having a lower portion, data input keys and a portable input device side connector arranged in the lower portion of said portable input device;
   a main device having an operation face; and
   a holder, coupled to said main device and having a portable input device insertion opening, for holding said portable input device therein, said holder having a main device side connector for connecting to said portable input device side connector, said holder being coupled to said main device so that said holder is rotatable between a storing position at which said portable input device is held in said holder so that said portable input device is substantially parallel to said main device, and an extraction position at which the portable input device insertion opening of said holder is projected at an angle with respect to the operation face of said main device and said portable input device is inclined relative to said main device.

2. A terminal input apparatus as set forth in claim 1, wherein said holder comprises:
   a lid mounted on said insertion opening of said holder, so that said lid is tilted at an angle; and
   a spring coupled to said lid so that said lid is normally closed by said spring and said lid can be pushed downward into said insertion opening against said spring.

3. A terminal input apparatus as set forth in claim 2, wherein said lid has side edges, wherein said holder further comprises side plates each having a thickness-increased portion, including a bottom, above said lid, and wherein the bottoms of said thickness-increased portions of said side plates cover the side edges of said lid.

4. A terminal input apparatus as set forth in claim 1, wherein said portable input device side connector and said main device side connector each comprise a non-contact type light connection portion and a mechanical contact type connection portion, wherein one of said mechanical contact type connection portions includes a connecting pin and the other includes an insertion hole having a connecting terminal therein, so that said mechanical contact type connection portions are electrically connected by inserting said connecting pin in said insertion hole to contact said connecting terminal.

5. A terminal input apparatus as set forth in claim 4, further comprising closing means for closing said insertion hole, wherein said insertion hole has an opening and wherein said closing means is arranged in the opening of said insertion hole.

6. A terminal input apparatus as set forth in claim 5, wherein said closing means comprises two closing members capable of elastically touching and separating from each other, wherein said closing members are arranged in parallel to each other so that they are in contact with each other on the axis of said insertion hole, and wherein said two closing members can be pushed outward to be separated from each other when said connecting pin is inserted into said insertion hole.

7. A terminal input apparatus as set forth in claim 5, wherein said closing means comprises a thin conductor plate covering said insertion hole, so that when said connecting pin is inserted in said insertion hole, said thin conductor plate is deformed by said connecting pin and is pressed against said connecting terminal, wherein said connecting pin is in electrical contact with said connecting terminal.

8. A terminal input apparatus as set forth in claim 4, further comprising a spring for biasing said connecting terminal in said insertion hole, wherein said connecting terminal has a top end portion, and wherein said connecting pin impinges against the top end portion of said connecting terminal in said insertion hole to push said connecting terminal against said spring and press said connecting pin against said top end portion of said connecting terminal, whereby electrical connection is accomplished between said connecting pin and said connecting terminal.

9. A terminal input apparatus as set forth in claim 1, wherein said main device has a projection formed on said operation face above the position where said portable input device is stored in said holder at said storing position, and wherein said projection prevents dislodging of said portable input device.

10. A terminal input apparatus as set forth in claim 1, further comprising lock means
for securing and holding said holder in said main device at the storing position.

11. A terminal input apparatus as set forth in claim 1, wherein said portable input device includes:
a keyboard unit having data input keys;
a processor, coupled to said keyboard unit, for processing data;
a memory circuit coupled to said processor;
a battery coupled to said processor; and
display means, coupled to said keyboard unit and said processor, for providing a display, and wherein said main device includes:
wiring means for connection to an external power source;
a transformer coupled to said wiring means;
a control circuit having a processor coupled to said transformer; and
a printer coupled to said processor.

12. A terminal input apparatus as set forth in claim 11, wherein said main device is mounted on a truck and wherein the external power source is a truck battery which is connected to said wiring means.

13. A water-proof and dust-proof connector structure comprising a first connector having a first contact projecting therefrom; and
a second connector having an insertion hole and a second contact formed in the interior of said insertion hole, said first contact mechanically connecting said second contact of said second connector so as to electrically connect said first contact and said second contact, said second connector further including two closing members capable of elastically touching and separating from each other, said two closing members being arranged in parallel to each other and disposed above said second contact in said insertion hole, so that said two closing members are in contact with each other on the axis of said insertion hole, and so that by inserting said first contact in said insertion hole, said two closing members are pushed outward by said first contact and separated from each other.

14. A connector structure as set forth in claim 13, wherein each of said two closing members comprises a cylindrical sleeve, and wherein said second connector further comprises a hair pin type spring for gripping both of said cylindrical sleeves to urge said cylindrical sleeves into contact with each other.

* * * * *

UNITED STATES PATENT AND TRADEMARK OFFICE
CERTIFICATE OF CORRECTION

PATENT NO. : 4,773,032
DATED : SEPTEMBER 20, 1988
INVENTOR(S) : KOICH UEHARA ET AL.

It is certified that error appears in the above-identified patent and that said Letters Patent is hereby corrected as shown below:

Col. 1, line 32, delete "having a holder for containing the";
       line 33, delete line in its entirety;
       line 34, delete line in its entirety;
       line 35, delete "the main device.";
       line 56, "current. Instead" should be --current,--;
       line 61, "current, and" should be --current. Instead,--.

Col. 3, line 52, after "a" insert --block--;
       line 53, delete "block".

Signed and Sealed this

Tenth Day of January, 1989

Attest:

DONALD J. QUIGG

*Attesting Officer*      *Commissioner of Patents and Trademarks*